(12) United States Patent
Rothwell

(10) Patent No.: US 11,535,461 B2
(45) Date of Patent: *Dec. 27, 2022

(54) WALL PANEL INVERTER AND PREFABRICATION METHOD

(71) Applicant: Jordan Byron Rothwell, Burlington (CA)

(72) Inventor: Jordan Byron Rothwell, Burlington (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,519

(22) Filed: Aug. 4, 2021

(65) Prior Publication Data

US 2021/0362962 A1 Nov. 25, 2021

Related U.S. Application Data

(63) Continuation of application No. 16/892,515, filed on Jun. 4, 2020, now Pat. No. 11,084,668, which is a continuation of application No. 16/040,593, filed on Jul. 20, 2018, now Pat. No. 10,710,817.

(60) Provisional application No. 62/534,780, filed on Jul. 20, 2017.

(51) Int. Cl.
*B65G 47/90* (2006.01)
*B27M 1/08* (2006.01)
*B23Q 7/04* (2006.01)

(52) U.S. Cl.
CPC ............ *B65G 47/904* (2013.01); *B27M 1/08* (2013.01); *B23Q 7/04* (2013.01); *B23Q 2240/002* (2013.01)

(58) Field of Classification Search
CPC .......... B65G 47/904; B27M 1/08; B23Q 7/04; B23Q 2240/002
See application file for complete search history.

(56) References Cited

U.S. PATENT DOCUMENTS

| | | |
|---|---|---|
| 2,656,051 A | 10/1953 | Jenkins |
| 3,696,567 A | 10/1972 | Villaneu |
| 3,758,067 A | 9/1973 | Kleiber |
| 3,835,620 A | 9/1974 | Boltz et al. |
| 3,849,228 A | 11/1974 | Lingl |
| 3,850,319 A | 11/1974 | Di Frank et al. |
| 3,930,929 A | 1/1976 | Lingl |
| 4,175,655 A | 11/1979 | Baldwin |
| 5,515,796 A | 5/1996 | Ogle et al. |
| 6,099,768 A | 8/2000 | Strickland et al. |
| 6,648,585 B2 | 11/2003 | Block et al. |
| 10,710,817 B2 * | 7/2020 | Rothwell ............. B65G 47/904 |
| 11,084,668 B2 * | 8/2021 | Rothwell ................ B27M 1/08 |
| 2003/0091419 A1 | 5/2003 | Haas |

(Continued)

*Primary Examiner* — Lynn E Schwenning
(74) *Attorney, Agent, or Firm* — Carlson, Gaskey & Olds, P.C.

(57) ABSTRACT

An inverter manufacturing cell includes a table including a base, a frame configured to receive a work piece, and at least one pivotable lift arm attached to the base and to the frame. The pivotable lift arm is configured to pivot relative to the base about at least one axis such that the frame and work piece rotate from a first, generally horizontal position to a second, generally vertical position. After rotating to the second, vertical position, the frame is configured to slide such that the frame and work piece further rotate to a third, generally horizontal position wherein the frame and work piece are inverted relative to the first, generally horizontal position.

13 Claims, 7 Drawing Sheets

(56) References Cited

U.S. PATENT DOCUMENTS

Figure 1:
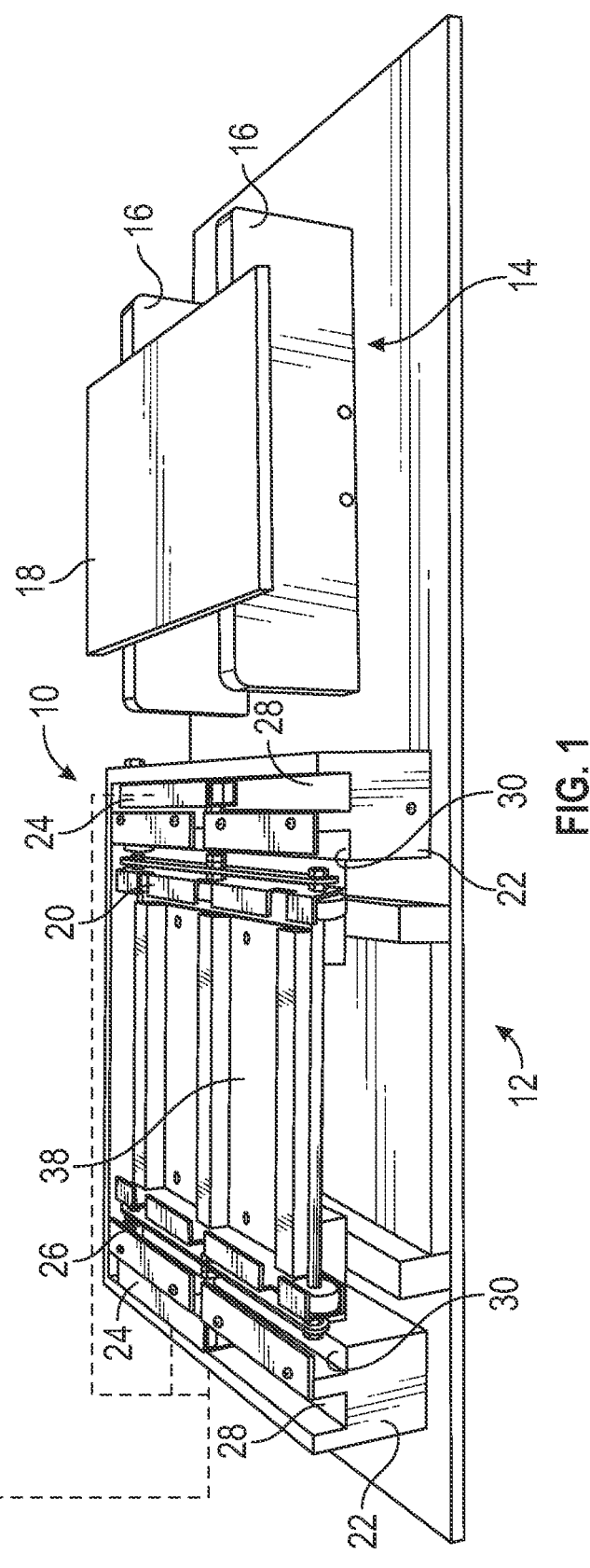

| | | |
|---|---|---|
| 2006/0277741 A1* | 12/2006 | Anderson ........... E04G 21/1891 29/772 |
| 2007/0237622 A1 | 10/2007 | Domenz |
| 2012/0125516 A1 | 5/2012 | Wechsler et al. |
| 2013/0259631 A1 | 10/2013 | Allen et al. |
| 2015/0298916 A1 | 10/2015 | Susnjara |

\* cited by examiner

WALL PANEL INVERTER AND PREFABRICATION METHOD

This application is a continuation of U.S. patent application Ser. No. 16/892,515 filed Jun. 4, 2020, which is a continuation of U.S. patent application Ser. No. 16/040,593, filed Jul. 20, 2018, now U.S. Pat. No. 10,710,817 granted Jul. 14, 2020, which claims priority to U.S. Provisional Patent Application Ser. No. 62/534,780, filed Jul. 20, 2017, each of which are hereby incorporated by reference herein in their entireties.

BACKGROUND

This disclosure relates to devices and methods for prefabricating materials, and more particularly to a panel inverter for prefabricating wall panels and a method of doing the same.

Houses and other types of residential housing, as well as other types of housing or building construction, may include the use of a variety of prefabricated components. These constructions are experiencing a growing trend toward the use of prefabricated components, such as wall panels. Prefabricating components for construction saves time during the construction process while also decreasing manufacturing time.

Interfaces used for prefabricating panels result in large assembly lines with large footprints and may use multiple different devices to work on different surfaces of a panel, increasing manufacturing time and expense, and making it more difficult to retrofit existing assembly lines.

Given the growing popularity of prefabricated components, manufacturing processes and equipment for performing prefabrication would be able to increase speed, efficiency, and customization of the prefabricated component. There is also an increasing tendency to add other content to prefabricated walls, typically hollow cavity walls, during manufacture.

SUMMARY

In one non-limiting embodiment, an inverter manufacturing cell comprises a table including a base, a frame configured to receive a work piece, and at least one pivotable lift arm attached to the base and to the frame. The pivotable lift arm is configured to pivot relative to the base about at least one axis such that the frame and work piece rotate from a first, generally horizontal position to a second, generally vertical position. After rotating to the second, vertical position, the frame is configured to slide such that the frame and work piece further rotate to a third, generally horizontal position wherein the frame and work piece are inverted relative to the first, generally horizontal position.

In another non-limiting embodiment, a method of using an inverter manufacturing cell includes providing a table including a base, a frame configured to receive a work piece, and at least one pivotable lift arm attached to the base and the frame. The work piece is received in the frame. The lift arm is pivoted relative to the base about at least one axis to rotate the frame and the work piece from a first, generally horizontal position to a second, generally vertical position. Subsequent to pivoting the lift arm, the frame is slide to further rotate the frame and work piece to a third, generally horizontal position wherein the frame and work piece are inverted relative to the first, generally horizontal position. At least one manufacturing process is performed on the work piece subsequent to either the pivoting step, the sliding step, or both.

BRIEF DESCRIPTION OF THE DRAWINGS

FIG. 1 is a perspective view of a PIM Cell and associated component in a first position.

FIG. 2 is a perspective view of a PIM Cell and associated component in a second position.

FIG. 3 is a perspective view of a PIM Cell and associated component with lift arms raised.

FIG. 4 is a perspective view of a PIM Cell and associated component with lift arms in a partially lowered position.

FIG. 5 is a perspective view of a PIM Cell and associated component with lift arms in a position lower than that of FIG. 4.

FIG. 6 is a perspective view of the bolt and the lock interface insert of FIG. 5 in an uninstalled position.

FIG. 7 is a perspective view illustrating movement of the lift arm between a first position and a second position.

These and other features disclosed herein can be best understood from the following specification and drawings, the following of which is a brief description.

DETAILED DESCRIPTION

FIGS. 1-6 illustrate, in a number of different positions, a perspective view of an inverter-manufacturing cell, such as a panel inverter-manufacturing ("PIM") cell 10 used to hold and move wall panels or similar types of products for manufacturing. The PIM cell 10 includes a table 12 and a panel holder 14. In one example, the panel holder 14 includes two struts 16 spaced apart to support at least one work piece, such as a panel 18. Other types of panel holders 14 such as a single piece panel holder may be used. Although not shown, panel holder 14 may incorporate an automated system configured to move the panel 18 to the table 12. Such automated system (not shown) may include a conveyor, wheels or a belt to slide the panel 18, or alternatively may be a separate machine that is configured to move the panel 18 to the table 12.

In one example, the panel 18 is a prefabricated wall panel having hollow cavity walls. The example panel 18 has a rectangular geometric profile; however, other geometric profiles may be used that are attachable to the table 12 and provide further ease of manufacturability using the PIM cell 10.

The table 12 includes the frame 20 that is configured to hold panel 18 in place during operation of the PIM cell 10 and an adjustable work piece, such as a conveyor 38. The conveyor 38 includes a top surface to hold the panel 18. The conveyor 38 is adjustable to align the surface holding the panel 18 with the top surface of the frame 20 to facilitate moving the panel 18 into a frame 20. Once the panel 18 is secured within the frame 20, the conveyor 38 can lower itself to avoid interfering with the operation of the rest of the PIM cell 10 and corresponding manufacturing processes.

The frame 20 is adjustable to hold different sized panels 18. The table 12 also includes a base 22 and lift arms 24 moveably attached to the base 22. In this example, two lift arms 24 are shown and arranged parallel to one another in two parallel slots 28 of the base 22. The lift arms 24 are arranged to move relative to the base by pivoting about at least one axis 23. In this example, the axis 23 is near the center of the frame 20 and of the respective slot 28. The lift arms 24 are hinged at one end and pivot out from the base 22 from a position parallel with its respective slot 28 to a position perpendicular or nearly perpendicular to respective slot 28.

The lift arms 24 are attached to frame 20 and configured to move frame 20 between a first position and a second position. In one example, the frame 20 is rotated by lift arms 24 between 0° and 180° as will be described in further detail below. In this manner, the lift arms 24 can pivot the frame 20 to multiple different positions.

The frame 20 is also attached to wheels 26. Each wheel 26 is disposed in a respective track 30 that is generally parallel to slots 28. The wheels 26 are moveable along a respective track 30 to move the frame 20 such that the frame rotates. The wheels 26 in combination with the lift arms 24 provide rotation of the frame 20 between 0° and 180° without having to remove the frame 20 from the table 12.

In one example, the frame 20 is adjustable to hold panels 18 with a height up to about 12 feet, a length up to about 16 feet and a thickness between about 3.5 inches to about 8 inches.

A controller 32 in communication with the PIM cell 10 is configured to move the frame 20 using lift arms 24 and wheels 26 to any position necessary to perform manufacturing processes. In this manner, the panel 18 can be held at various positions and angles to permit work on the panel 18. The controller 32 communicates with linear actuators, or other actuators, to allow for synchronized movement of the lift arms 24. In one example, the actuators include sensors for position sensing to provide synchronized movement of the lift arms 24 without mechanic linkages between the respective lift arms 24. Proximity sensors may also be used for providing synchronized movement of the lift arms 24.

In operation, as shown in FIG. 1, the panel 18 is slid linearly onto conveyor 38. In this example, the conveyor 38 is a raised conveyor 38 such as a skate wheel roller track. However, other types of conveyors 38 may be used. The conveyor 38 now holding panel 18 is adjusted until the top surface of the panel 18 is flush with the tops surface of the frame 20.

Figure 2:
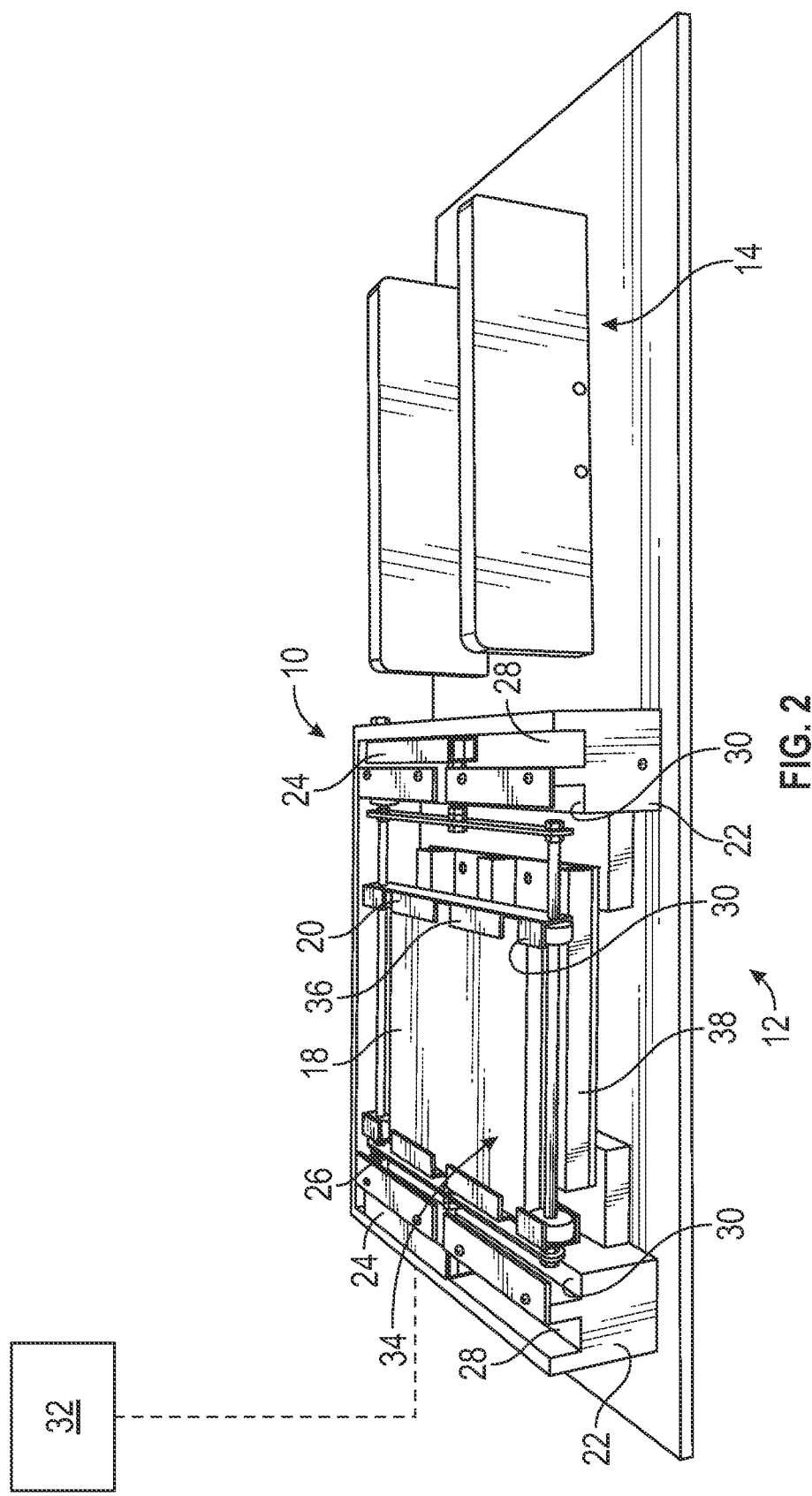

Referring to FIG. 2, the panel 18 is resting within the frame 20 with a first side 34 facing outward. A sliding clamp 36 running lengthwise forms one side of the frame 20. The sliding clamp 36 slides toward the opposing side of the frame along linear guides 39 arranged near the ends of the frame 20. The sliding clamp 36 is moved towards the opposite side of the frame 20 until the panel 18 is securely held in place within the frame 20. In one example, the sliding clamp 26 is on any side of the frame 20 and is arranged to move towards the opposite side of the frame 20 to secure the panel 18 in the frame 20. The conveyor 38 is then retracted into the bottom of table 12. The conveyor 38 may be covered to form a level floor and working area within the PIM cell 10 to provide ease of access and manufacturing on the panel 18 when in a desired position, as will be described in further detail below.

Figure 3:
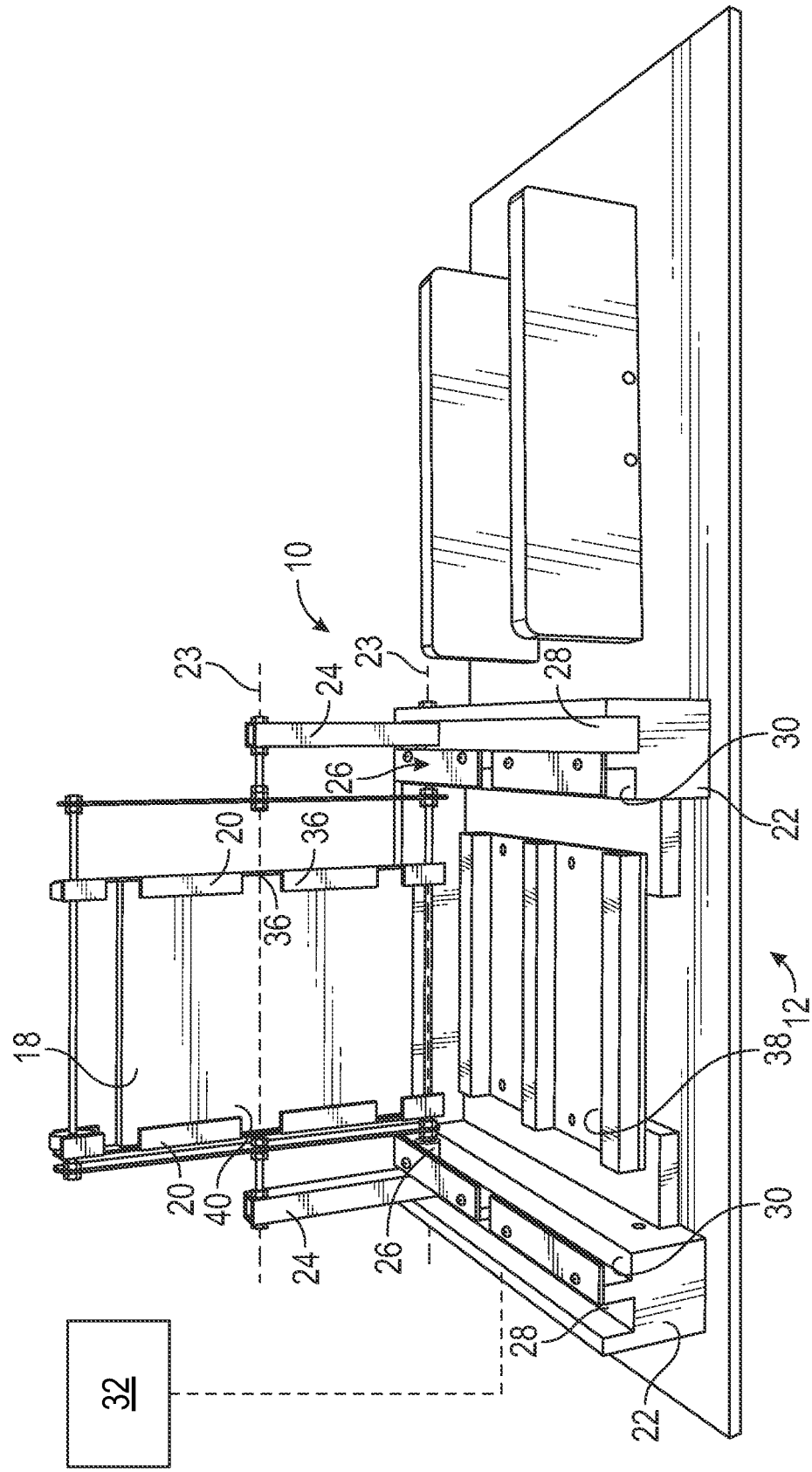

Referring to FIGS. 2 and 3, the frame 20 is attached to table 12 at each end by axles attached to lift arms 24 that form hinge points near the center of the frame 20. The lift arms 24 raise and lower the frame 20. The frame 20 is also attached by wheels 26 located near the outer corners of the frame 20. In one example, the wheels 26 are at an end opposite the sliding clamp 36. The wheels 26 are set in the tracks 30 and move provide additional rotation of the frame 20. The tracks 30 guide the wheels 26 as well as preventing them from rising off of the track to the frame 20 is safely restrained.

In one example, at least one additional wheel may be used to move sliding clamp 36. In one example, three wheels 26 on single axles are used within the PIM cell 10.

Referring to FIG. 3, the lift arms 24 are actuated upwards rotating the frame 20 with secured panel 18 into an upright position. When lift arms 24 reach a near perpendicular position, wheels 26 are aligned with hinge points of the lift arms 24. In this position a second side 40 of the panel 18 is now visible.

Figure 4:
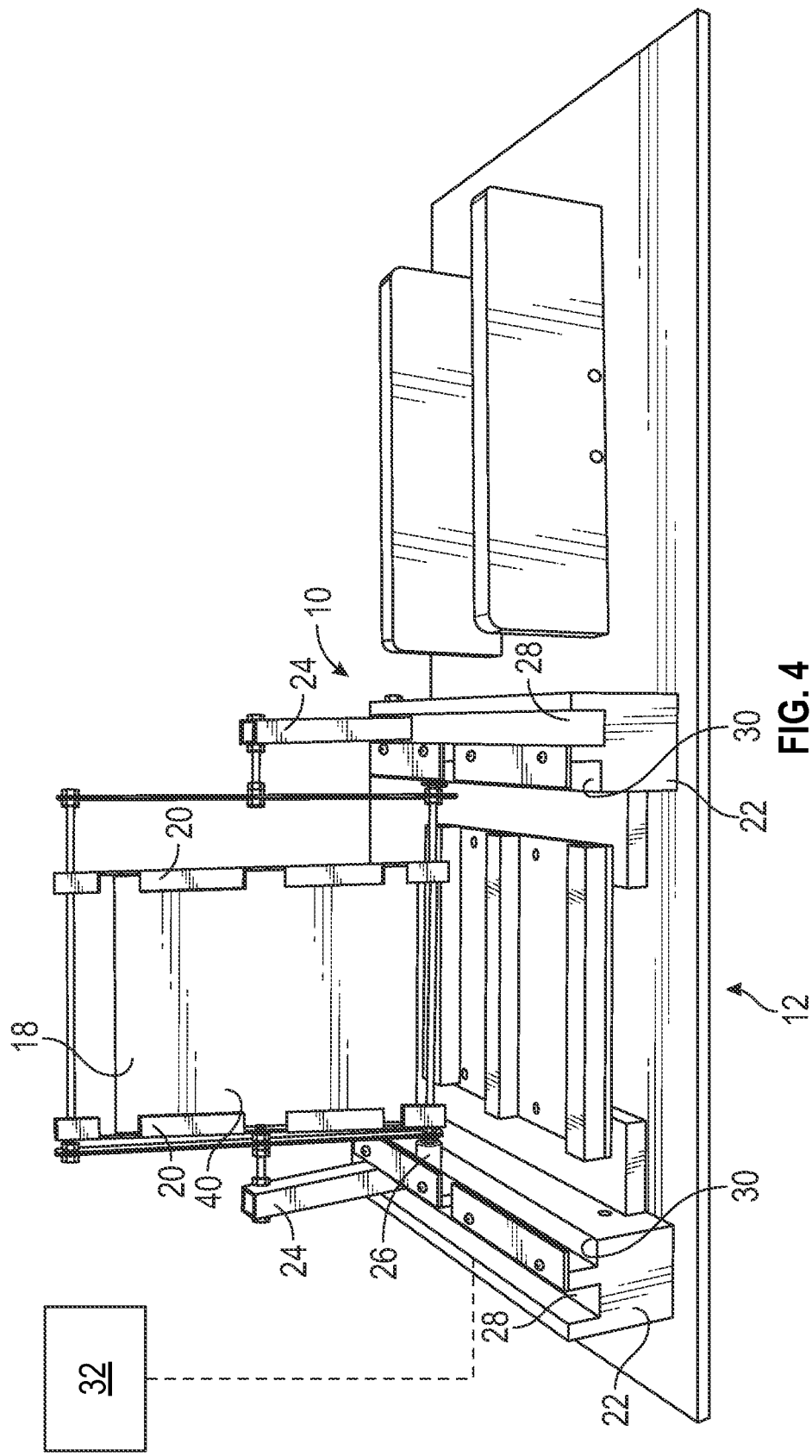
Figure 5:
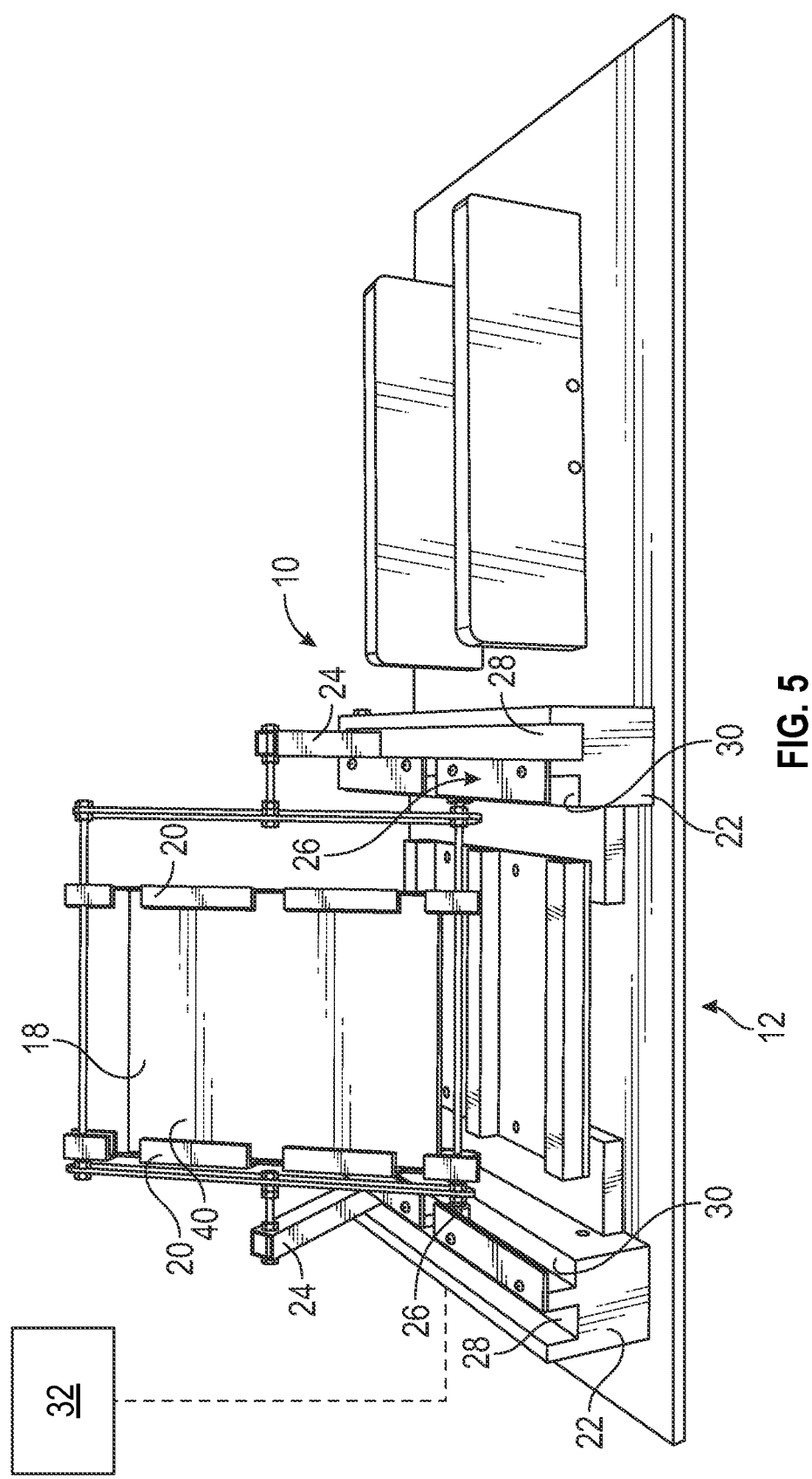
Figure 6:
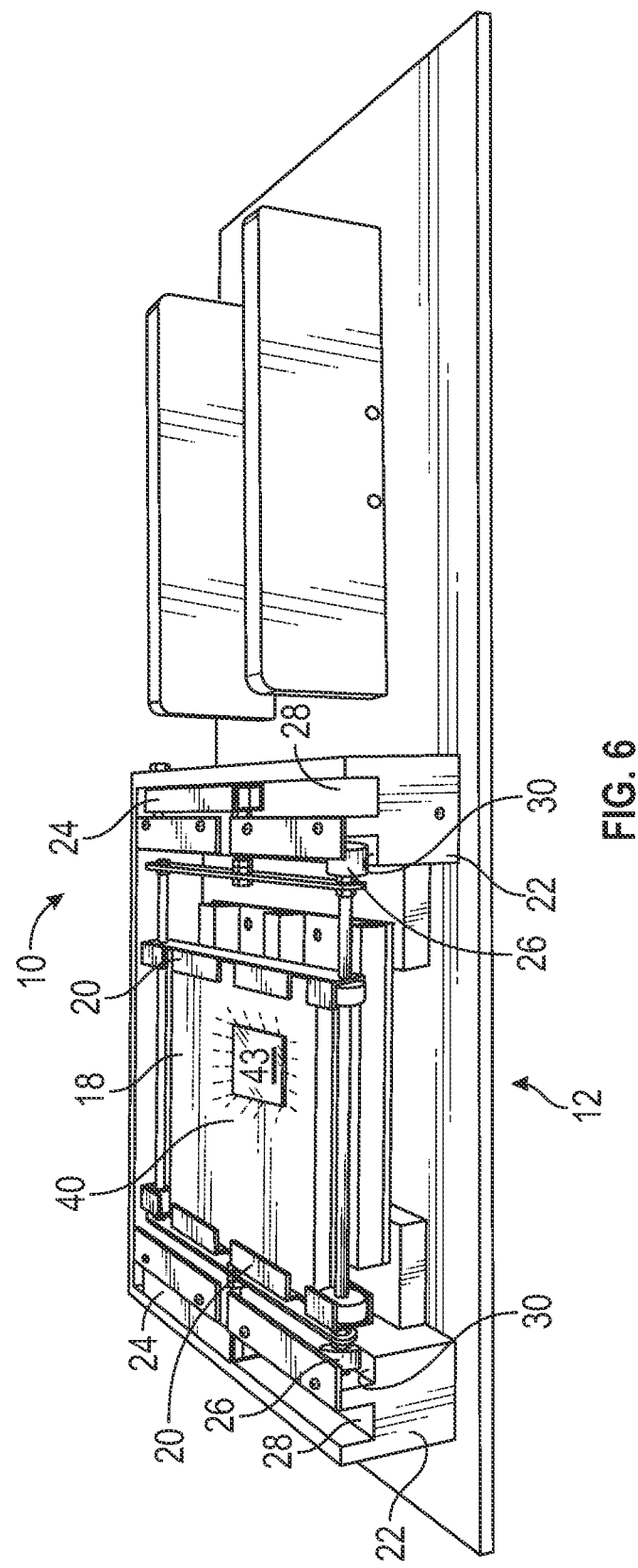

Referring to FIGS. 4-6, wheels 26 move down tracks 30 away from the hinge point of the lift arms 24 to continue to rotate the frame 20 and panel 18. At the same time, lift arms 24 retract to rotate the frame 20 and panel 18. Wheels 26 move such that the frame 20 and panel 18 become inverted from the beginning position shown in FIG. 2. In this manner, second side 40 is now facing outwards. The frame is moveable to any desired position and location for ease of work processes and manufacturing. Example non-limiting positions are shown in FIGS. 4, 5 and 6.

The process described in FIGS. 2-6 may be reversed to return the frame 20 and panel 18 to its original position with first side 34 facing outwards. Once back in the original position, the panel 18 can be removed from the frame 20 for further manufacture or shipping.

In one example, the frame 20 is assisted in moving in the desired direction at the point of inflection when the frame 20 is raised vertically. A spring, or pusher device, (not shown) is used to push the wheels 26 away from the lift arms 24 to the opposite side of the table 12. This prevents the wheels from jamming and preventing the frame 20 and panel 18 from inverting.

In another example, the frame is assisted in moving in the desired direction after the point of inflection by shaping tracks 30 to be sloped downward toward the center of the table 12 on both sides. The slope of the tracks 30 biased the wheels 26 to release in a direction towards the center of the table 12 as the lift arms 24 lowered. By sloping both sides of the tracks 30 downward toward the center of the table 12, a level plane is maintained when the lift arms were completely lowered.

The PIM cell 10 allows the panel to be stopped and held in place at any point along the tracks 30 and in an inverted position to permit work on the panel 18 in any number of positions, and on either side of the panel 18. This allows the manufacturer to perform tasks 43 on the panel 18 in the optimal position: horizontal, vertical, or any position in-between. After work is completed, the panel 18 can be returned to its original orientation for shipment to a site for installation and use.

Figure 7:
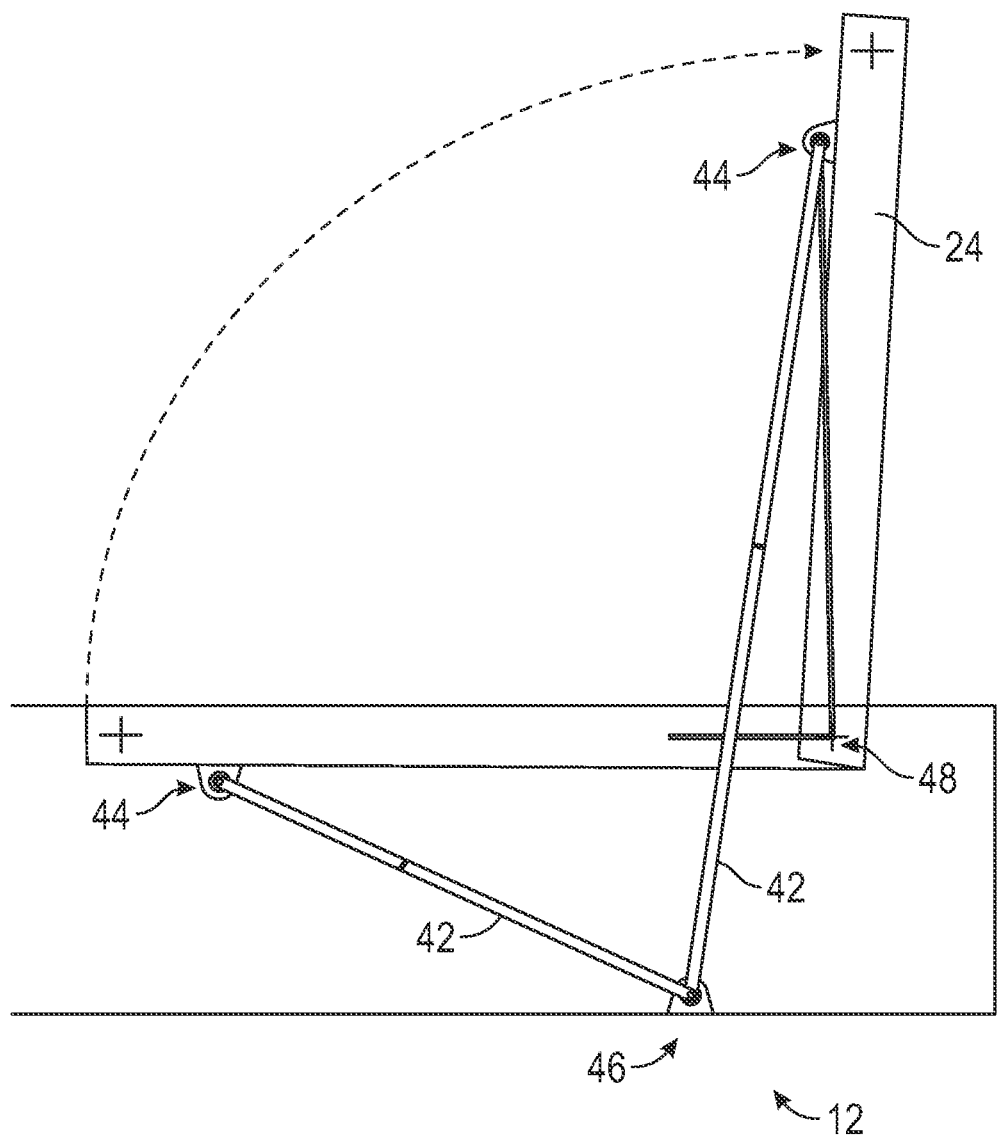

Referring to FIG. 7, the lift arm 24 is shown in a horizontal position and a vertical position. A hydraulic cylinder 42 is shown and used to raise and lower the lift arm 24. The hydraulic cylinder is attached to the lift arm 24 at a first location 44 and to the table 12 at a second location 46. The example attachment configuration allows the frame 20 and panel 18 (not shown) to act as a counterbalance reducing lift loads and maintaining the majority of the weight on the end corresponding to the second location 46. In this example, the second location 46 is about 1 foot beneath the outer edge of the PIM cell 10.

In this example, when in the vertical position, the first location is about 7 feet from the outer edge of the PIM cell 10 to provide rotational direction. The example arrangement further reduces the overall height of the PIM cell 10 and the frame 20 when in an upright position, improving reach height for operators when working on the panel 18 in the vertical position. This example arrangement also allows the PIM cell 10 to operate under lower ceiling heights.

In this example, the distance between the first location 44 and the second location 46 when in the horizontal position is about 4 feet. The distance between the first location 44 and the second location 46 when in the vertical position is about 9 feet. When the frame 20 is at full extension i.e. vertically aligned to be as tall as possible, a hinge point 48 of the frame 20 is at an angle less than 90° relative to the first location 44.

Although the different embodiments have the specific components shown in the illustrations, embodiments of this disclosure are not limited to those particular combinations. It is possible to use some of the components or features from one of the embodiments in combination with features or components from another one of the embodiments.

The preceding description is exemplary rather than limiting in nature. Variations and modifications to the disclosed embodiments may become apparent to those skilled in the art that do not necessarily depart from the essence of this disclosure.

What is claimed is:

1. An inverter manufacturing cell comprising:
    a panel holder including a first strut and a second strut spaced from the first strut, wherein the panel holder is configured to hold a work piece;
    a base located adjacent the panel holder, the base including a first slot and a second slot spaced apart from the first slot, wherein the first slot and second slot are configured to be positioned on first and second opposing sides of the work piece;
    a frame configured to hold the work piece, the frame including a first side and a second side, wherein the first side and the second side are spaced apart and configured to contact the first and second opposing sides of the work piece;
    and a first pivotable lift arm and a second pivotable lift arm each attached to the base and to the frame, wherein the first pivotable lift arm and the second pivotable lift arm are configured to pivot relative to the base about at least one axis such that the frame and the work piece rotate from a first, generally horizontal position to a second, generally horizontal position wherein the frame and the work piece are inverted relative to the first, generally horizontal position.

2. The inverter manufacturing cell of claim 1, wherein the first pivotable lift arm and second pivotable lift arm are configured to pivot from the first, generally horizontal position to a third, generally vertical position, and wherein the frame is configured to subsequently slide such that the frame and work piece further rotate to the second, generally horizontal position wherein the frame and work piece are inverted relative to the first, generally horizontal position.

3. The inverter manufacturing cell of claim 2, wherein the first pivotable lift arm and second pivotable lift arm are configured to rotate the frame to move the work piece to any position between the first, generally horizontal position and the third, generally vertical position, and between the third, generally vertical position, and the second, generally horizontal position such that a manufacturing process can be performed on either side of the work piece at different angles.

4. The inverter manufacturing cell of claim 1, wherein the frame is disposed between the first pivotable lift arm and the second pivotable lift arm.

5. The inverter manufacturing cell of claim 1, wherein the first pivotable lift arm is attached to the frame at a first location and the second pivotable lift arm is attached to the frame at a second location, wherein the second location is on an opposite side of the frame from the first location.

6. The inverter manufacturing cell of claim 1, wherein the first pivotable lift arm is arranged generally parallel to the second pivotable lift arm.

7. The inverter manufacturing cell of claim 6, wherein each of the first pivotable lift arm and the second pivotable lift arm is hinged at one end.

8. The inverter manufacturing cell of claim 1, wherein the first pivotable lift arm and the second pivotable lift arm are attached to the base and moveable at the same time without mechanic linkages between the first pivotable lift arm and the second pivotable lift arm.

9. The inverter manufacturing cell of claim 8, further comprising a controller configured to communicate with at least one actuator to allow for synchronized movement of the first pivotable lift arm and the second pivotable lift arm.

10. The inverter manufacturing cell of claim 1, wherein the frame is attached to a first wheel and a second wheel configured to move parallel to the first wheel such that the frame is slidable.

11. The inverter manufacturing cell of claim 1, wherein the first side of the frame is a sliding clamp that is adjustable relative to the second side of the frame such that the frame is adjustable to hold different sized work pieces.

12. The inverter manufacturing cell of claim 1, wherein the first side of the frame and the second side of the frame are parallel.

13. The inverter manufacturing cell of claim 1, wherein the work piece is a prefabricated wall panel having hollow cavity walls.

* * * * *